Oct. 9, 1962 G. H. FRANCK 3,057,083
ENGINE NOISE SIMULATOR
Filed Jan. 30, 1958 3 Sheets-Sheet 1
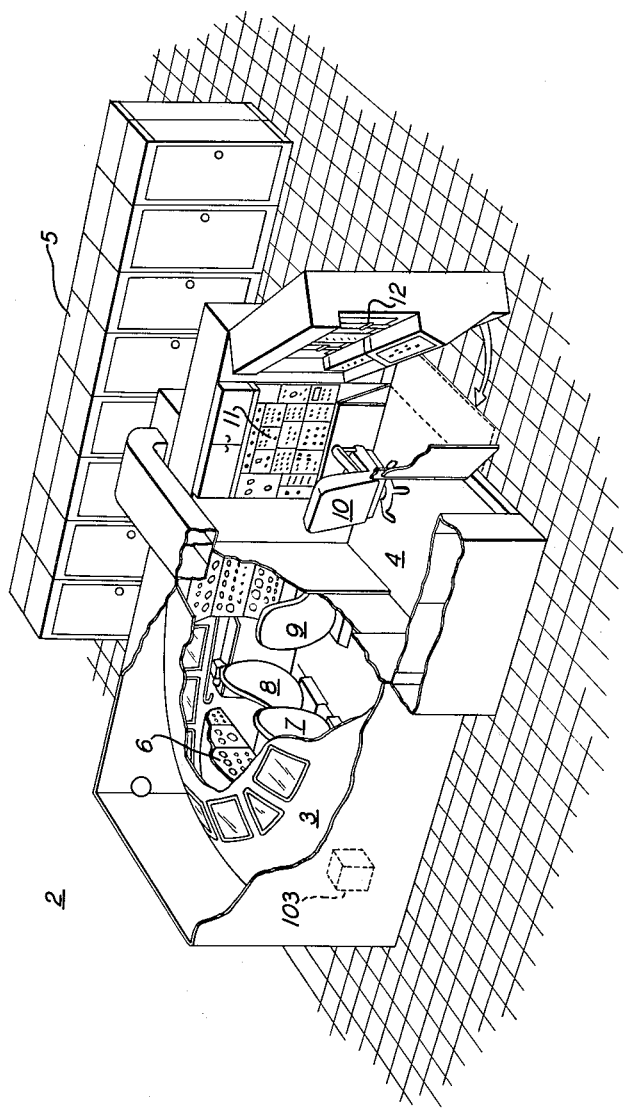
INVENTOR
GLENN H. FRANCK
BY Donald P. Smith
ATTORNEY

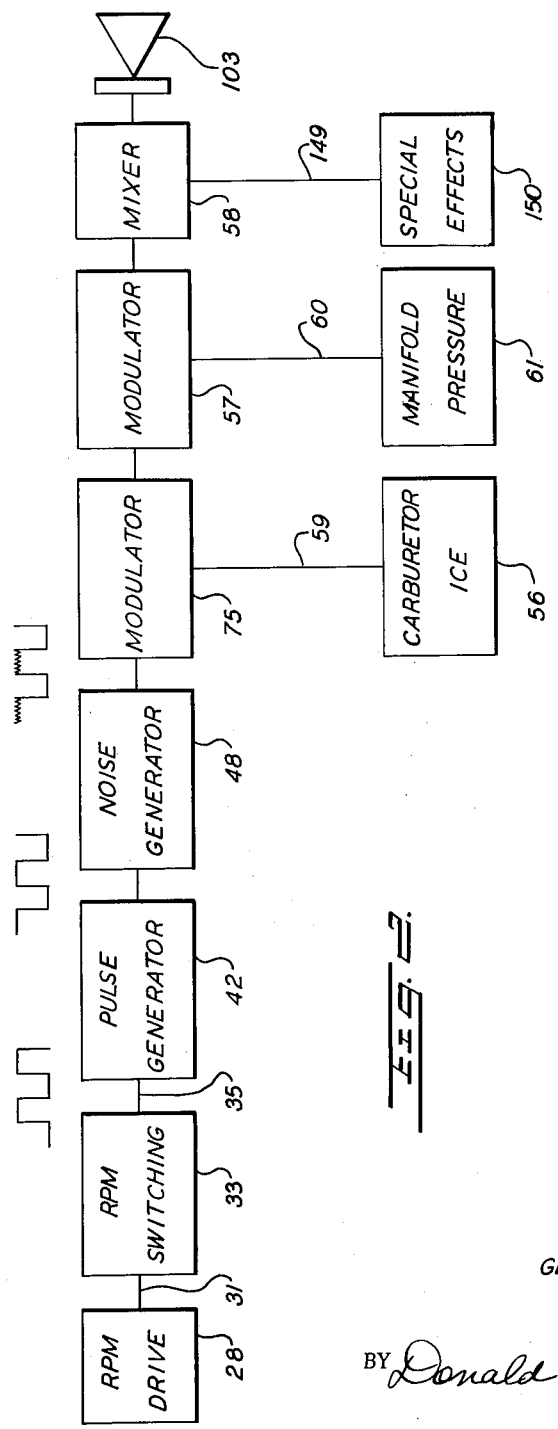

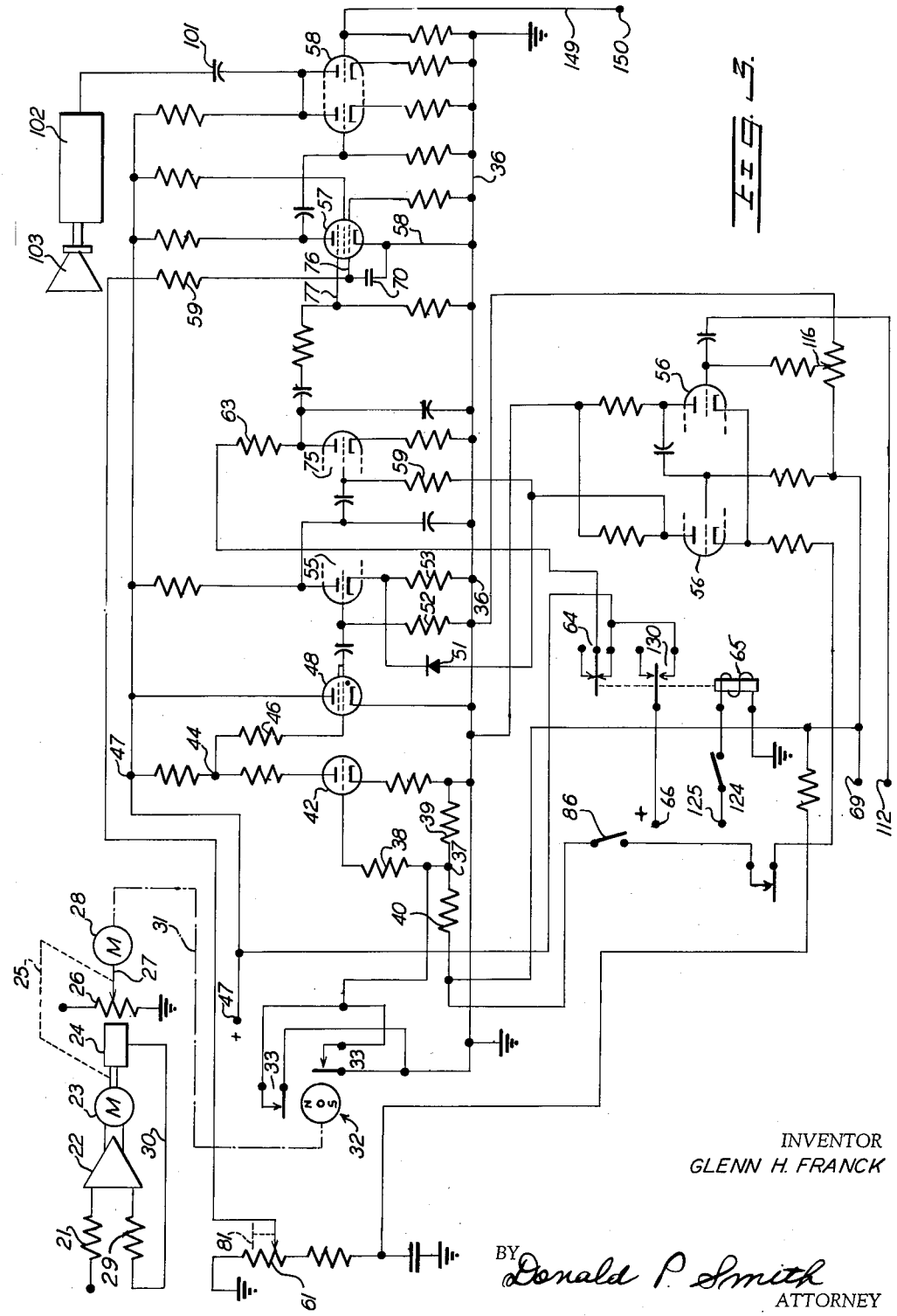

United States Patent Office 3,057,083
Patented Oct. 9, 1962

3,057,083
ENGINE NOISE SIMULATOR
Glenn H. Franck, District Heights, Md., assignor to ACF Industries, Incorporated, New York, N.Y., a corporation of New Jersey
Filed Jan. 30, 1958, Ser. No. 712,248
6 Claims. (Cl. 35—12)

This invention relates generally to aircraft or flight simulation and more specifically to the aural simulation of aircraft engine noises.

The invention comprises an electronic apparatus for developing a composite sound reproducing cylinder explosion noise and provides additional optional circuitry for modifying this engine sound with noises representing carburetor icing conditions, tire screech, prop squeak, engine backfire and air noise, all of which are heard by a student pilot through an amplifier and a speaker arranged in a simulated cockpit.

During the operation of an actual aircraft the pilot hears a sound pulse for each detonation within the cylinder of the reciprocating engine. The frequency with which these pulses occur and therefore the tone or pitch of the sounds is dependent upon the number of cylinders and the speed of the engine. Also heard within the craft is a screech which results from the tires touching the runway upon landing the aircraft. Propeller squeak caused by noise generated by air moving relative to small apertures or irregularities in the extremities of the blades, engine backfire and the noises made by the passage of air over all the surfaces of the airplane during flight are all aural indications of effects encountered by a pilot during flight. It is to the simulation of this composite effect that this invention is directed.

Prior art flight simulators utilize a multi-vibrator or phantastron type of electronic circuit to produce pulses which may be modulated by random noise tubes or other flight noise effects. In such a system the repetition rate of sounds cannot be easily and accurately controlled and if more than one engine is to be simulated the problem of synchronizing the r.p.m. of one with the other is difficult if not impossible. These difficulties are due primarily to slight voltage changes causing frequency drift in the sound generators while the r.p.m itself has not changed.

This invention provides, in a relatively simple structure, an engine noise simulator having a positive, accurate control over the engine explosion noise in reference to the engine r.p.m. and a system which does not have the disadvantages of frequency drift encountered in multi-vibratior type sound simulators. This aids in synchronizing sounds of more than one engine when a multi engine craft is simulated. The invention in its most sophisticated form overcomes the shortcomings of the prior art engine simulators by providing modifying means to alter the engine sound in response to carburetor ice, manifold pressure, tire screech, propeller squeak, backfire and air noise.

It is therefore a broad object of this invention to provide a circuit for simulating the engine cylinder sound pulses of an aircraft engine.

It is a further object of this invention to provide means for simulating engine sound in which the explosion sound repetition rate is accurately controlled with respect to engine r.p.m.

It is a still further object of the invention to provide engine simulating means of such accuracy as to be easily synchronized with other systems of similar construction.

It is also an object of this invention to provide in a grounded flight trainer, means for modifying or modulating the effects of engine cylinder sound with other sound characteristics present in actual aircraft operation.

It is a still further object of this invention to provide means for generating simulated sounds in accordance with the speed of the simulated engine and to modify the aural signals of such simulation with the effects of carburetor ice, manifold pressure, engine switching ON and OFF, tire screech, prop squeak, backfire noises and air noises.

Referring now to the drawings,

FIG. 1 is a perspective view of an aircraft flight simulator.

FIG. 2 is a block diagram of the engine noise simulator of this invention.

FIG. 3 is a more detailed schematic representation of the engine noise simulator system.

Summarily stated, it is the purpose of this invention to provide electronic flight simulation means for simulating the noise of engine cylinder explosions to a high degree of accuracy, the number of explosions per unit of time being easily adjusted and being modified as desired with miscellaneous effects such as carburetor ice, tire screech, prop squeak, backfire and air noises as well as manifold pressure.

The prime consideraiton in simulating the operation of an aircraft engine is the proper simultaion of number, amplitudes and tone of the noises which occur within the cylinders of the engine as heard by a pilot. During the actual flight of an aircraft the pilot hears other effects which either directly or indirectly are connected with the engine itself. Four of the effects which directly control the sounds are the speed of the engine, engine backfire, carburetor ice, and manifold pressure. These sounds all directly emanate from the engine itself. Other sounds the pilot hears are external to the engine but are blended together to form the complex of those sounds present during flight. Some of these external sounds as discussed, supra, are air noises, propeller squeak and the screech of tires when the aircraft lands.

Referring now to FIG. 1 a flight simulator installation 2 normally comprises a simulated aircraft cockpit 3, an instructor's station 4, and computer racks 5. Flight instruments 6 are placed to be viewed by students occupying the pilot's and co-pilot's chairs 7 and 8. A flight engineer who occupies positional chair 9 is normally present in flight simulators of large aircraft. Associated with the instructor's chair 10 are duplicate instruments 11 and plotting boards 12. An audio speaker 103 is placed so as to be easily heard by the student crew members.

The block diagram of FIG. 2 illustrates the basic elements of one embodiment of the invention in which sounds simulating those heard in an aircraft are generated. An r.p.m. drive 28 responsive to the simulator engine r.p.m. computer mechanically drives magnetic r.p.m. switches 33 through drive 31. The switches 33 alternately bias pulse generator 42 to produce a pulse for each switch operation. The output of the pulse generator is conducted to noise generator 48 which modulates the peaks of the generated pulses with random noise as there shown in the wave form. The resulting signal at the output of the noise generator 48 is a burst of noise for each operation of the magnetic switches 33, each burst of noise representing an engine sound pulse. This signal is conducted to modulator 75 where the coughing effect of carburetor ice 56 is introduced through connection 59. The output of modulator 75 is therefore a steady normal engine sound with intermittent omissions to represent the coughing effect resulting from ice clogging the aircraft carburetor. Modulator 57 mixes the effect of manifold pressure 61 with the engine sound as modified by the carburetor ice effects from modulator 75. Manifold pressure effect does not introduce an audio sound of itself but instead modifies the normal engine sound output. Manifold pressure changes the intensity of the engine sound by biasing the modulator stage 57. The aural effects of tire screech, propeller squeak, engine backfire and air noise may be introduced from the special effects source 150 by conductor 149 to mixer stage 58 which further modifies the signal from modulator 57. The output of mixer 58 is connected to the audio speaker 103 in the vicinity of the student pilot as previously explained. It is thus seen that the environment of simulated flight is enhanced by this invention to the extent of having an audio simulation of engine sound as modified by the expected effects of incidental operational noises. The number of operational noises simulated will necessarily be dictated by the degree of completeness of flight simulation desired and the selection thereof is within the ability of one skilled in the art once the invention is explained.

Referring now to FIG. 3 the main driving source for engine noise is a velocity servo consisting of an integrator comprising a motor 23 and generator 24. An input voltage from the simulator's engine r.p.m. computer, per se known in the art, is applied to impedance 21. This voltage is amplified in the amplifier 22 and the output is fed to motor 23. Motor 23 then rotates at a velocity proportional to the input voltage applied to impedance 21. Attached to the motor shaft is a generator 24 which generates an output voltage proportional to the rate at which motor 23 revolves. This generates a voltage at conductor 30 which is fed back to impedance 29 to be summed with the initial input voltage at input impedance 21. This feedback voltage since it is generated in a sense in opposition to the voltage input at 21 at some one speed of the motor 23 will balance out the input voltage 21 so that a constant speed is attained. Thus for each separate input voltage at 21 there is a definite speed at which rotational equilibrium will occur. The servo operates at a velocity which generates a voltage to answer an input signal. Shaft 25 moves in accordance with the motion of motor 23 and positions the wiper arm 27 of potentiometer 26. The positioning of the wiper 27 picks off a voltage which is fed to induction motor 28. Motor 28 then revolves at a speed proportional to the r.p.m. of the engine simulated. The motion of shaft 31 imparts a rotation to magnetized disc 32. The proximity of the magnet 32 to the switches 33 allows the magnetic force of the magnet to actuate the switches 33 thus connecting the grid of tube 42 to ground through impedance 38. When these switches 33 are all opened the grid of tube 42 is connected to a negative voltage, terminal 69, through the voltage divider comprising impedances 39 and 40. This divider provides a negative potential at junction 37 which is connected to the grid of the tube through impedance 38. Thus every time a switch 33 closes the voltage of the grid of tube 42 will rise, or have a positive going pulse applied to it. This positive going pulse for each closure of a switch 33 results in an output negative pulse at junction 44 which is transmitted through impedance 46 to the grid of noise tube 48. The output of tube 48 appears as the wave form there shown between the noise generator and modulator in FIG. 2, the signal being a square wave modulated by random noise. It is this random noise superimposed upon pulses that realistically represents each explosion within a cylinder of a reciprocating engine. Since there are two magnetic switches shown and their operation is independent of polarity of the magnet the grid of stage 42 will be connected to ground and therefore generate a positive going pulse four times for each revolution of the permanent magnet 32. These positive pulses are thus produced at the plate of stage 42 as negative pulses as shown in FIG. 2 and are applied to the grid of the noise generator tube 48 through isolation resistor 46. The resulting signal at the output of 48 is a signal pulse for each operation of the magnetic switches 33 which simulates the sound of an engine cylinder explosion. Noise pulse lengths can be adjusted by moving the switches 33 closer or further from the magnet. More or fewer cylinders may be simulated either by adding more switches 33 around the periphery of the permanent magnet 32 or by adjusting the motor 28 to rotate at a more rapid rate in reliance upon the operation of motor 23.

The engine ON switch 124 is connected between power source 125 and engine ON relay 65. Operation of the switch energizes the relay to apply the positive D.C. voltage from terminal 66, through relay contacts 64 and 130 to connector 47 and to one side of impedance 63.

The carburetor ice conditions may cause a coughing or sputtering sound in the actual aircraft engine. These sounds are generated by a random low frequency noise source, as from a backwardly biased diode, applied at terminal 112 triggering the circuit of tube 56. The magnitude of the noise which will trigger the circuit is adjustable by the bias adjustment 116. The output of the carburetor ice tube 56 is a random negative pulse which is applied to the engine noise amplifiers 55 and 75 through the parallel connection of diode 51 and impedance 59. At this point the signal is mixed with the engine explosion noise pulses. The result of the combined engine explosion noise and carburetor ice effects at stage 55 is that of a sputtering engine when ice conditions are simulated. Carburetor ice conditions are switched on and off by the instructor at the instructor's station 4 by operation of the carburetor ice switch 86. The operation of this switch allows the negative voltage from terminal 69 to be applied to the cathodes of stages 56, thereby allowing conduction of those two triode sections of the tube.

The engine noise signal transmitted to stage 57 is further modified in intensity by computed manifold pressure. The manifold pressure signal is developed at potentiometer 61 by the mechanical shaft 81 which has been positioned as a result of the electro-mechanical computer which may compute the value of manifold pressure for the flight simulator in accordance with the patent to Chapple, Patent No. 2,553,526. In this circuit control grid 76 of tube 57 has bias as a function of manifold pressure applied to it to change the signal amplitude and the sound signal as modified by carburetor ice is applied to grid 77. It is the combination of these two modifying effects on the normal engine sound signal which appears as output at the plate of tube 57.

The output of stage 57 is transmitted to the grid of tube 58 where it is optionally mixed with other audio signals. These signals may comprise tire squeak, air noise, backfire noise and propeller squeak and can be derived by the methods shown by Stevens in Patent No. 2,490,487. The combination of these signals may be referred to as special effects noise. The combination of these signals appear as an output of stage 58 and are conducted through capacitor 101 to audio amplifier 102 where they are amplified and fed to speaker 103 which is mounted in a location convenient for the pilot to hear, the exact location not being critical.

Summing up the operation of this circuit it can be seen that tube 42 will develop a pulse train responsive to the frequency of actuation of switches 33 which are in turn responsive to the output of the computed engine r.p.m. as applied to amplifier 22. The pulse train is modified by random noise developed in tube 48 and is then passed to the output amplifier and speaker to be heard by the student. If the instructor so desires the pulse train may be interrupted by the carburetor ice simulator stage 56 and the amplitude may be varied by the manifold pressure stage. Any additional special effects, known per se in the art, may optionally be introduced at the mixer stage 58 to complete the sound simulation.

It is thus seen that by this invention the audio effects of an engine are realistically simulated and the proper importance has been placed on the relative conditions which have to be met. The main consideration of the invention is the simulation of engine explosion noise which is a function of simulated aircraft speed as computed elsewhere in the flight simulator. This invention describes a unique manner of generating these sound signals in a stable and easily controlled manner and modifying them with other simulated effects so as to give a comprehensive audio simulation to the student pilot.

It should be understood that this invention is not limited to specific details of construction and arrangement thereof herein illustrated and that changes and modifications may occur to one skilled in the art without departing from the spirit of the invention.

What is claimed is:

1. In an aircraft trainer of the type having a circuit to compute engine r.p.m. and a circuit to compute manifold pressure a system for simulating the sounds made by the engines comprising in combination means for generating a signal pulse train having a pulse frequency corresponding to the computed engine r.p.m., a noise circuit connected to the output of said last recited means to modulate the respective pulses at an audio frequency, a circuit connected to the output of said last recited circuit to interrupt the pulse train in simulation of carburetor ice conditions, means for increasing the amplitude of the modulated pulse train in accordance with rise of simulated manifold pressure, and means connected to the said last named means to amplify the pulse train for driving a speaker located in the training station.

2. In an aircraft trainer a system for simulating to a student the sounds incident to flight comprising a pulse generator for developing a signal train having a pulse frequency in accordance with the simulated r.p.m. of the aircraft engines during simulated flight, a noise circuit connected to said pulse generator to modulate the individual signal pulses at an audio frequency, a circuit to interrupt the modulated pulse train in simulation of carburetor ice condition, means for modifying the amplitude of the modulated pulse train in simulation of manifold pressure modification, and means connected to said last named means to amplify the pulse train for driving a speaker located in the vicinity of the student.

3. In an aircraft trainer of the type having a circuit to compute engine r.p.m. and a circuit to compute manifold pressure a system for simulating the sounds made by the engine comprising in combination driving means rotatable at a rate corresponding to the computed engine r.p.m., means connected to said driving means to generate a pulse train having a frequency in accordance with the rate of rotation of the driving means, a noise circuit connected to the output of said last recited means to modulate the respective pulses at an audio frequency, a circuit under the control of an instructor and connected to the output of said last recited circuit to interrupt the pulse train in simulation of carburetor ice conditions, means connected to the said last named circuit to modify the amplitude of the modulated pulse train in accordance with changes in simulated manifold pressure, and means connected to the said last named means to amplify the pulse train for driving a speaker located in the training station.

4. In an aircraft trainer of the type having a circuit to compute engine r.p.m. and a circuit to compute manifold pressure a system for simulating to a trainee the sounds made by the engines comprising in combination driving means rotatable at a rate corresponding to computed engine r.p.m., a magnetized member connected to said driving means and rotatable therewith, an assemblage of switches disposed about the periphery of said member to be actuated thereby, a circuit connected to the said switch assemblage to generate a pulse train having a frequency in accordance with the rate of rotation of the driving means, a noise circuit connected to the output of said last recited means to modulate the respective pulses at an audio frequency, a circuit under the control of an instructor and connected to the output of said last recited circuit to interrupt the pulse train in simulation of carburetor ice conditions, means connected to the said last named circuit to modify the amplitude of the modulated pulse train in accordance with changes in simulated manifold pressure, and means connected to the said last named means to amplify the pulse train for driving a speaker located in the training station.

5. In an aircraft trainer of the type having a circuit to compute engine r.p.m. and a circuit to compute manifold pressure a system for simulating to a trainee the sounds made by the engines comprising in combination driving means rotatable at a rate corresponding to computed engine r.p.m., a magnetized disc connected to the said driving means and rotatable therewith, said disc having discrete magnetized areas thereon, a group of switches fixed about the periphery of said disc and responsive to the magnetic force thereof to be actuated in seriatim as the disc rotates, a circuit connected to the said group of switches to generate a pulse train having a frequency in accordance with the rate of rotation of the driving means, a noise circuit connected to the output of said last recited means to modulate the respective pulses at an audio frequency, a circuit under the control of an instructor and connected to the output of said last recited circuit to interrupt the pulse train in simulation of carburetor ice conditions, means connected to the said last named circuit to modify the amplitude of the modulated pulse train in accordance with changes in simulated manifold pressure, and means connected to the said last named means to amplify the pulse train for driving a speaker located in the training station.

6. The invention as set forth in claim 5 wherein the said pulse train generating circuit comprises a multi electrode discharge device normally biased to cut off from a source of negative voltage, and means interconnecting the said switches between a source of relatively higher positive voltage and the control electrode of the discharge device whereby actuation of the respective switches produces a series of pulses at the output electrode of the device.

References Cited in the file of this patent

UNITED STATES PATENTS

| | | |
|---|---|---|
| 2,445,712 | Forbes | July 20, 1948 |
| 2,490,487 | Stevens | Dec. 6, 1949 |
| 2,494,594 | Swank | Jan. 17, 1950 |
| 2,510,500 | Hayes et al. | June 6, 1950 |
| 2,521,405 | Phelps | Sept. 5, 1950 |
| 2,533,484 | Lukacs et al. | Dec. 12, 1950 |
| 2,842,867 | Dehmel | July 15, 1956 |